(12) United States Patent
Hood et al.

(10) Patent No.: US 8,338,057 B2
(45) Date of Patent: Dec. 25, 2012

(54) GASKETS FOR FUEL CELLS

(75) Inventors: Peter David Hood, Leicester (GB); Simon Edward Foster, Leicestershire (GB)

(73) Assignee: Intelligent Energy Limited, Kent (GB)

( * ) Notice: Subject to any disclaimer, the term of this patent is extended or adjusted under 35 U.S.C. 154(b) by 780 days.

(21) Appl. No.: 12/300,616

(22) PCT Filed: May 14, 2007

(86) PCT No.: PCT/GB2007/001759
§ 371 (c)(1),
(2), (4) Date: Mar. 16, 2009

(87) PCT Pub. No.: WO2007/132219
PCT Pub. Date: Nov. 22, 2007

(65) Prior Publication Data
US 2009/0311569 A1     Dec. 17, 2009

(30) Foreign Application Priority Data

May 13, 2006 (GB) .................................. 0609566.5

(51) Int. Cl.
*H01M 2/08* (2006.01)
*H01M 2/18* (2006.01)

(52) U.S. Cl. ........ 429/509; 429/139; 429/185; 429/469; 429/510

(58) Field of Classification Search .............. 429/509, 429/510, 35, 469, 139, 185
See application file for complete search history.

(56) References Cited

U.S. PATENT DOCUMENTS

| | | | |
|---|---|---|---|
| 5,464,700 A * | 11/1995 | Steck et al. | 429/483 |
| 6,316,139 B1 | 11/2001 | Uchida et al. | |
| 2002/0055027 A1 * | 5/2002 | Inoue et al. | 429/30 |
| 2004/0012159 A1 | 1/2004 | Senda et al. | |
| 2004/0137303 A1 | 7/2004 | Kuroki et al. | |
| 2004/0209148 A1 * | 10/2004 | Ohara et al. | 429/35 |
| 2005/0112442 A1 | 5/2005 | Wells et al. | |

FOREIGN PATENT DOCUMENTS

| | | |
|---|---|---|
| GB | 2 434 845 | 8/2007 |
| JP | 06-096783 | 4/1994 |
| JP | 07-312223 | * 11/1995 |
| JP | 2006-004799 | 1/2006 |
| WO | 03/100894 | 12/2003 |

(Continued)

OTHER PUBLICATIONS

European Search Report dated Dec. 14, 2006, for corresponding GB Application No. 0609566.5.

(Continued)

*Primary Examiner* — Yogendra Gupta
*Assistant Examiner* — Jeremiah Smith
(74) *Attorney, Agent, or Firm* — Renner, Otto, Boisselle & Sklar, LLP (57) ABSTRACT

A gasket for sealing internal surfaces of a fuel cell and formed of compressible material, the gasket comprising a first sealing surface and a second sealing surface for providing a fluid seal against opposing faces of a first fluid flow field plate and a second fluid flow field plate respectively, the gasket further comprising a third sealing surface for sealing against an outer perimeter region of a first surface of a membrane electrode assembly, the third sealing surface being entirely enclosed within a boundary defined by an inner perimeter of the second sealing surface.

6 Claims, 10 Drawing Sheets

FOREIGN PATENT DOCUMENTS

WO 2006/024735 3/2006

OTHER PUBLICATIONS

European Examination Report for corresponding European Application No. 07732784.9, dated Mar. 9, 2010, 3 pages.

Response to Examination Report for corresponding European Application No. 07732784.9, dated Jul. 7, 2010, 4 pages.

International Search Report of International Application No. PCT/GB2007/001759, filed May 14, 2007, published in English under International Publication No. WO 2007/132219.

* cited by examiner

GASKETS FOR FUEL CELLS

This application is a national phase of International Application No. PCT/GB2007/001759 filed May 14, 2007, and published in the English language under International Publication No. WO 2007/132219.

The present invention relates to gaskets, and in particular gaskets for use in fuel cell assemblies.

Figure 1:
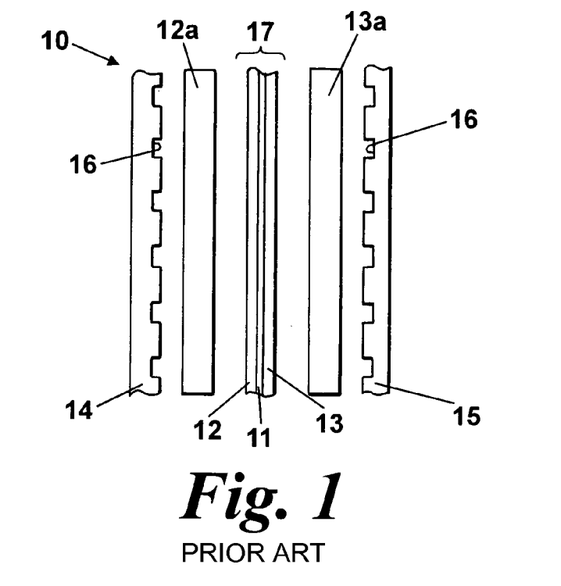
FIG. 1 shows a schematic cross-sectional view through a part of a conventional fuel cell.

Conventional electrochemical fuel cells convert fuel and oxidant into electrical energy and a reaction product. A typical layout of a conventional fuel cell 10 is shown in FIG. 1 which, for clarity, illustrates the various layers in exploded form. A solid polymer ion transfer membrane 11 is sandwiched between an anode 12 and a cathode 13. Typically. the anode 12 and the cathode 13 are both formed from an electrically conductive, porous material such as porous carbon, to which small particles of platinum and/or other precious metal catalyst are bonded. The anode 12 and cathode 13 are often bonded directly to the respective adjacent surfaces of the membrane 11. This combination is commonly referred to collectively as the membrane-electrode assembly, or MEA 17.

Sandwiching the polymer membrane and porous electrode layers is an anode fluid flow field plate 14 and a cathode fluid flow field plate 15. Intermediate backing layers 12a and 13a, also referred to as 'diffusers' or diffuser layers, may also be employed between the anode fluid flows field plate 14 and the anode 12 and similarly between the cathode fluid flow field plate 15 and the cathode 13. The backing layers are of a porous nature and fabricated so as to ensure effective diffusion of gas to and from the anode and cathode surfaces as well as assisting in the management of water vapour and liquid water.

The fluid flow field plates 14, 15 are formed from an electrically conductive, non-porous material by which electrical contact can be made to the respective anode electrode 12 or cathode electrode 13. At the same time, the fluid flow field plates facilitate the delivery and/or exhaust of fluid fuel, oxidant and/or reaction product to or from the porous electrodes 12, 13. This is conventionally effected by forming fluid flow passages in a surface of the fluid flow field plates, such as grooves or channels 16 in the surface presented to the porous electrodes 12, 13.

Figures 2A, 2B:
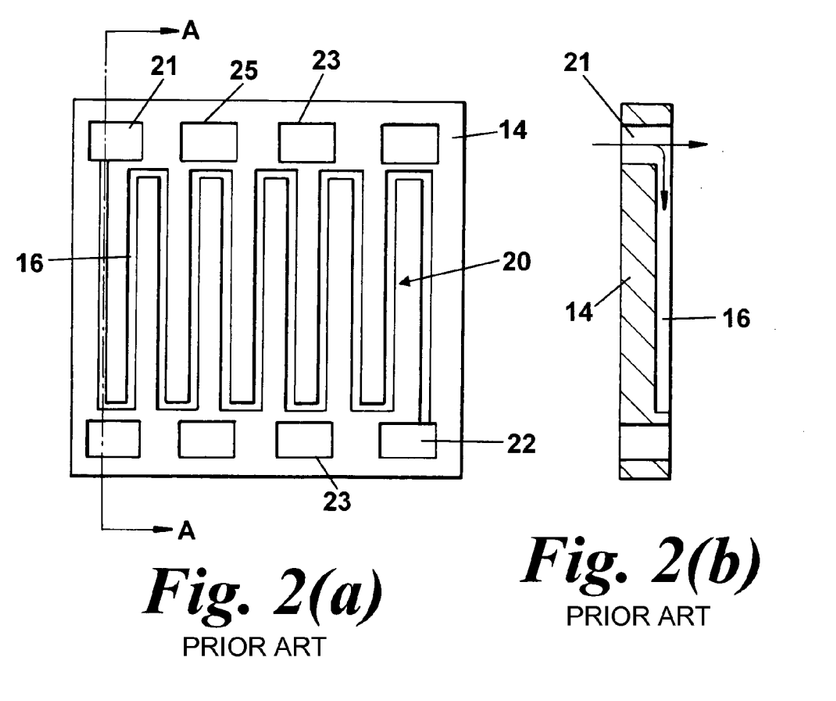

With reference also to FIG. 2(a), one conventional configuration of fluid flow channel provides a serpentine structure 70 in a face of the anode 14 (or cathode 15) fluid flow field plate, having an inlet port 21 and an outlet port 22 as shown in FIG. 2(a). According to conventional design, it will be understood that the serpentine structure 20) comprises a channel 16 in the surface of the plate 14 (or 15), while the ports 21 and 22 each comprise an aperture through the plate so that fluid for delivery to, or exhaust from, the serpentine structure 20 can be communicated throughout the depth of a stack of plates in a direction orthogonal to the plate as particularly indicated by the arrow in the cross-section on A-A shown in the FIG. 2(b).

Figure 3:
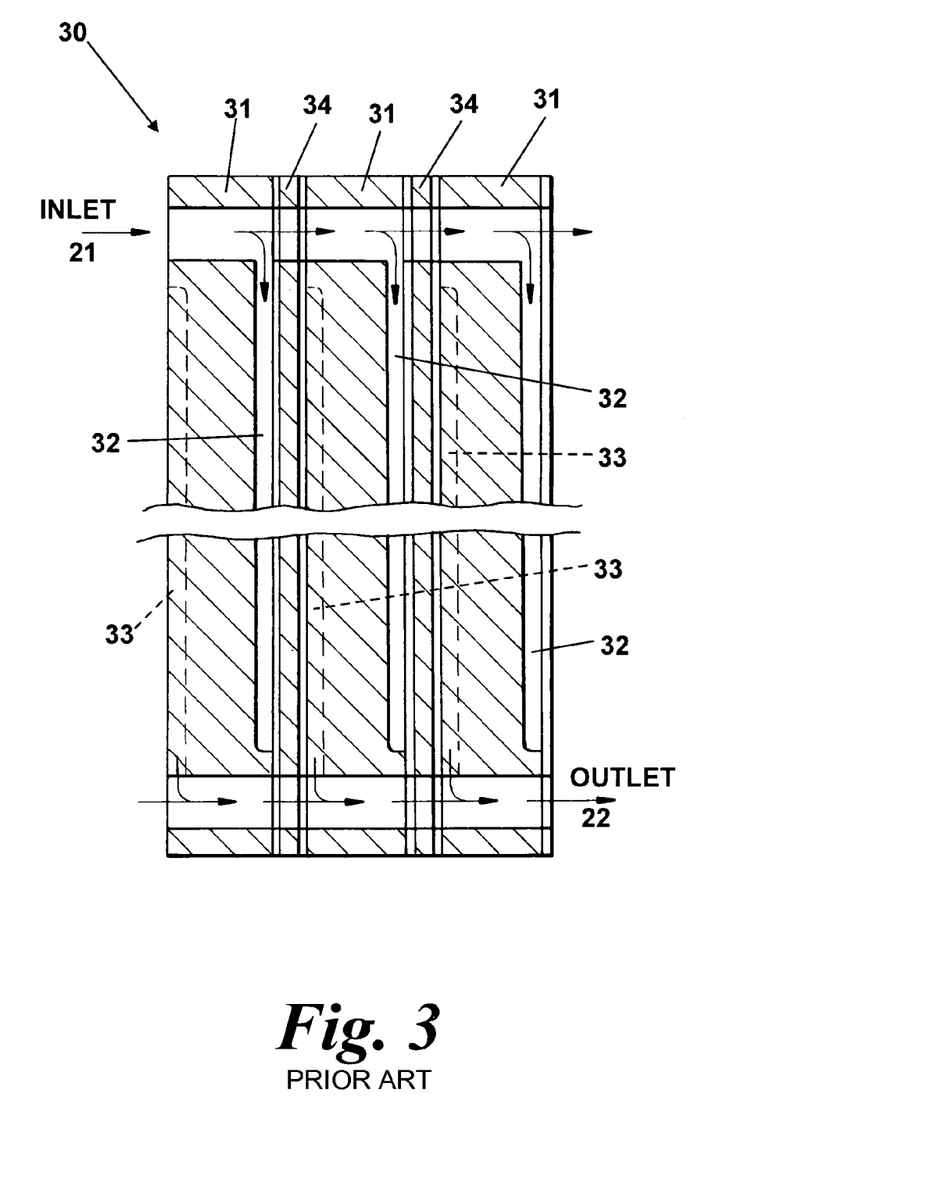
FIG. 3 shows a cross-sectional view through a conventional fuel cell stack with bipolar plates.

With reference to FIG. 3, in a conventional fuel cell assembly 30, stacks of plates are built up. In this arrangement, adjacent anode and cathode fluid flow field plates are combined in conventional manner to form a single bipolar plate 31 having anode channels 32 on one face and cathode channels 33 on the opposite face, each adjacent to a respective membrane-electrode assembly (MEA) 34. The inlet port apertures 21 and outlet port apertures 22 are all overlaid to provide inlet and outlet manifolds to the entire stack. The various elements of the stack are shown slightly separated for clarity, although it will be understood for the purposes of the present invention that they will be compressed together using sealing gaskets.

Figure 4:
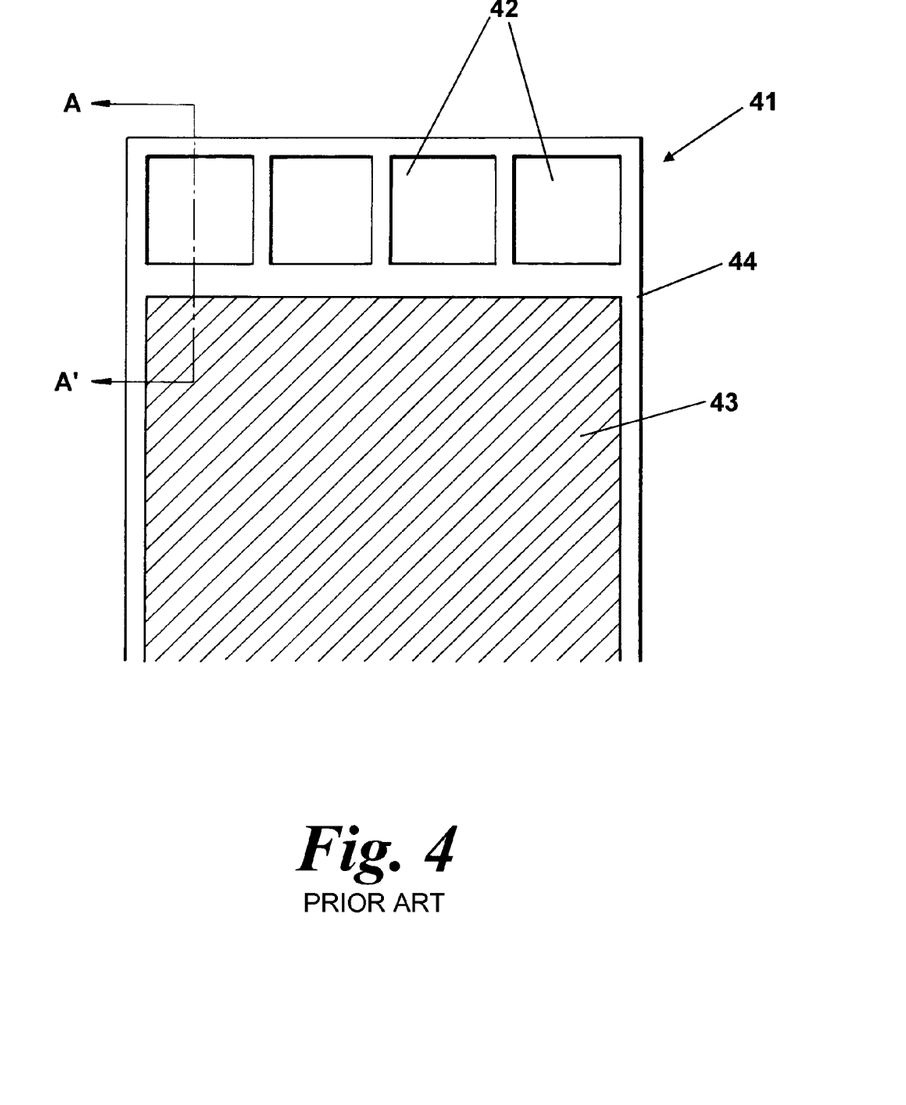
FIG. 4 shows a schematic plan view of a portion of a membrane-electrode assembly.

Referring to FIG. 4, a schematic partial view of a conventional MEA and diffuser assembly 41 is shorten, in which diffuser layers 43 are provided on each side of the MEA 44. A series of fluid ports 42 are provided within the MEA 44. These fluid ports 42 are provided to coincide with fluid ports in corresponding fluid flow plates and gaskets which, when assembled together in a stack, form manifolds for communicating fluid in a direction orthogonal to the planes of the MEAs. These manifolds are used to transport fluids through the depth of the stack to and from the diffuser layers 43.

Figure 5:
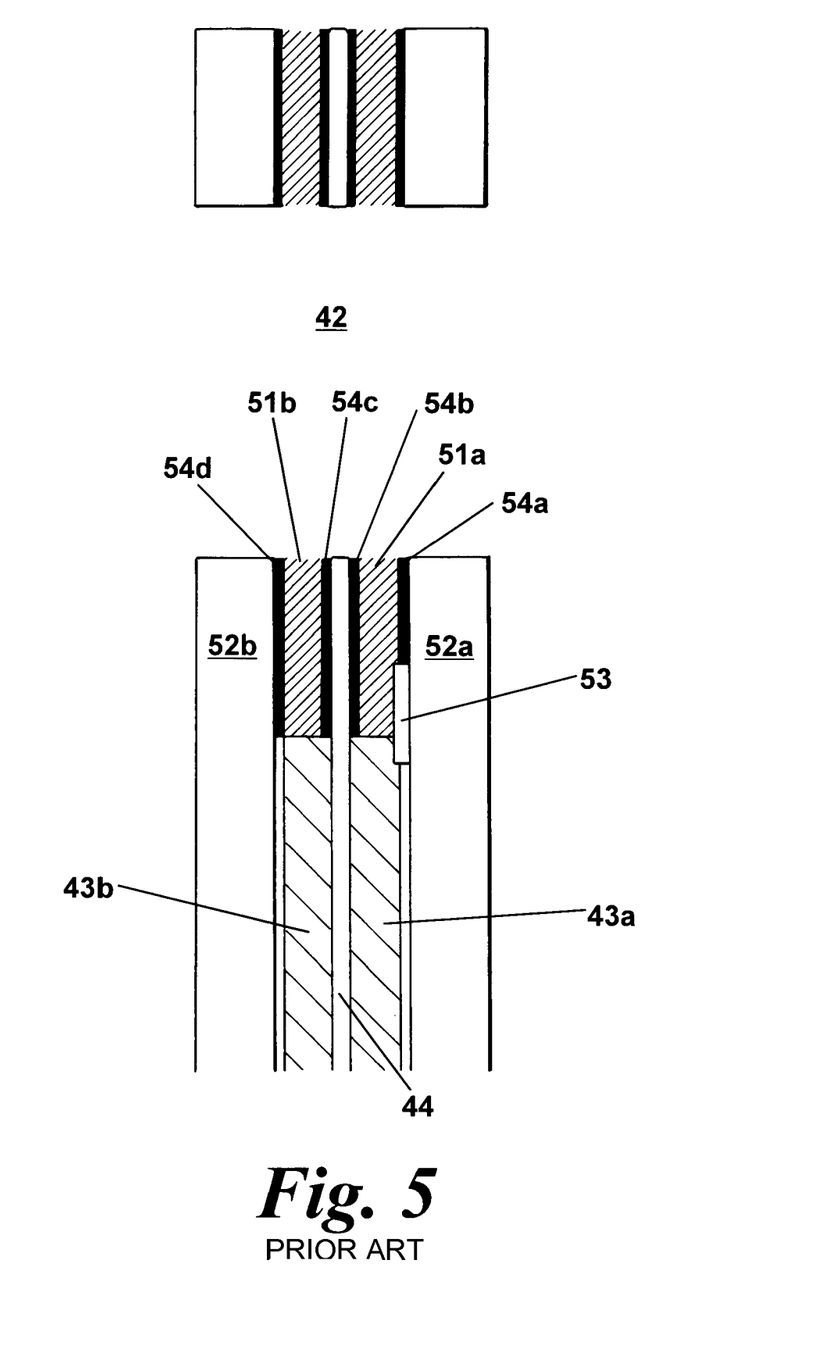
FIG. 5 shows a schematic cross-sectional view on line A-A' of a portion of the membrane-electrode assembly of FIG. 4 situated between two fluid flow field plates and sealed with conventional gaskets.

A section indicated by line A-A' in FIG. 4 is shown in a partial schematic cross sectional view in FIG. 5. The MEA 44, with diffuser layers 43a, 43b provided on either face, is now shown situated between two fluid flow field plates 52a, 52b.

Sealing surfaces 54a-d are provided between the MEA 44 and the fluid flow plates 52a, 52b by two gaskets 51a, 51b being situated either side of the MEA 44 and outside the region defined by the diffuser layers 43a, 43b. For the avoidance of doubt, these fluid seals 54a-d, and other fluid seals illustrated further, are not intended to indicate separate components of a fuel cell assembly, but to indicate areas of contact with a gasket where a fluid seal is formed en the MEA 44, the gaskets 51a, 51b and the fluid flow field plates 52a, 52b are placed under compression.

A relatively incompressible shim 53 may be provided on a surface of the fluid flow plate 59a, for example to allow flow of fluid to or from the diffuser layer 43a through channels provided in the shim, and/or to prevent the gasket 51a closing up channels provided in the fluid flow field plate 52a when under pressure. A fluid seal may also be provided against the shim, although this is less important to the operation of the fuel cell than the other fluid seals 54a-d, since the volume surrounding the shim 53 is typically otherwise sealed. This optional fluid seal is therefore not indicated in this and in further figures.

In FIG. 5 and subsequent figures the shim 53 is shown extending into a region at least partially occupied by the diffuser 43a which may for example correspond to an anode or cathode side into which cooling water is to be injected via channels formed within the shim 53. Such cooling water may be injected through other ports (not shown) provided within the fluid flow field plates that are also in fluid communication with the shim 53.

The conventional arrangement for a fuel cell assembly as shown in FIG. 5 has a total of four sealing surfaces 54a-54d for each MEA, formed on two separate gaskets 51a, 51b. It would be advantageous to be able to provide the same functionality with a reduced number of sealing surfaces and/or a reduced number of components, in order to simplify the assembly of a fuel cell and to reduce the total cost of the fuel cell.

Figure 6:
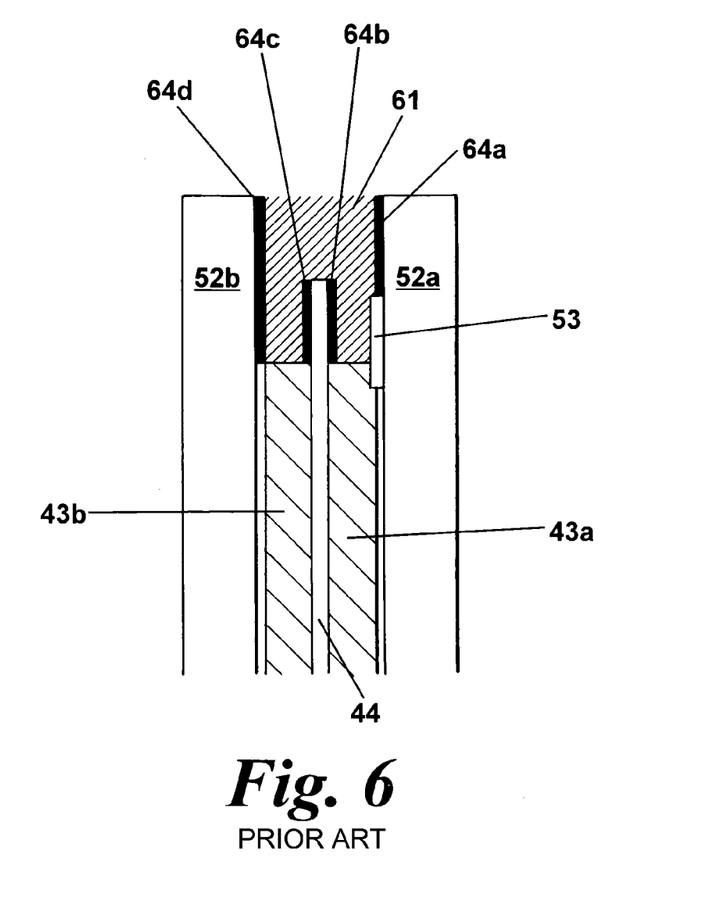
FIG. 6 shows a schematic cross-sectional view of a gasket arrangement for sealing a membrane-electrode assembly.

One way of reducing the number of components is to unify the gaskets 51a, 51b into a single gasket, as shown schematically in FIG. 6. In this arrangement, sealing surfaces 64a, 64d are provided between the gasket 61 and the fluid flow field plates 52a, 52b, but sealing surfaces 64b, 64c between the gasket 61 and the MEA 44 are provided within the same gasket 61, through the cross-section of the gasket 61 being in the form of a c-shape. The moulded gasket 61 effectively encapsulates the outer perimeter of the MEA 44. To achieve such a result requires tight control of the gasket dimensions so that the thickness of the gasket 61 is consistent with the working dimension of the MEA 44, together with the diffuser layers 43a, 43b. Although a reduction in the number of components may be achieved, this is at the expense of an increase in the complexity of the manufacturing process. Additionally, the tooling and processing required to create moulded gaskets 61 increases costs and reduces the design flexibility of the fuel cell.

It is an object of the present invention to provide an improved gasket design.

According to a first aspect, the present invention provides a fuel cell assembly comprising:
a first fluid flow field plate;
a second fluid flow field plate;
a membrane electrode assembly having first and second opposing faces, interposed between the first and second fluid flows field plates;
a gasket extending between the first and second fluid flow field plates and forming respective first and second sealing surfaces therewith,
the gasket also defining a third sealing surface, by which the gasket is in contact with only one face of the membrane electrode assembly.

According to a second aspect, the present invention provides a gasket for sealing internal surfaces of a fuel cell, comprising:
a first sealing surface and a second sealing surface on opposing faces of the gasket, and
a third sealing surface being entirely within a boundary defined by an inner perimeter of the second sealing surface,
wherein the gasket defines a step profile between the second and third sealing surfaces.

According to a third aspect, the present invention provides a method of forming a fuel cell assembly, comprising the sequential steps of:
(i) providing a first fluid flow field plate
(ii) laying a gasket on the first fluid flow field plate, the gasket having a first sealing surface, a second sealing surface and a third sealing surface, the third sealing surface being entirely within a boundary, defined by an inner perimeter of the second sealing surface, the first sealing surface being laid against the first fluid flow field plate;
(iii) laying a membrane-electrode assembly on the gasket, a perimeter edge portion of a first surface of the membrane-electrode assembly overlying the third sealing surface of the gasket;
(iv) positioning a second fluid flow field plate over the membrane electrode assembly and the gasket, the second fluid flow field plate overlaying the second sealing surface and a second surface of the membrane-electrode assembly; and
(v) applying compressive pressure between the first and second fluid flow field plates across the gasket and membrane electrode assembly to provide fluid seals between (i) the first sealing surface of the gasket and the first fluid flow plate, (ii) the second sealing surface of the gasket and the second fluid flow plate, and (iii) the third sealing surface of the gasket and membrane-electrode assembly, the gasket sealing against only one face of the membrane-electrode assembly.

Embodiments of the present invention will now be described by way of example and with reference to the accompanying drawings in which:

FIGS. 2(*a*) and 2(*b*) respectively show a simplified plan and sectional view of a fluid flow field plate of the fuel cell of FIG. 1;

The conventional designs of anode and cathode fluid flow plates incorporating fluid flow channels in the faces thereof have already been discussed in connection with FIGS. 1 to 3, and the arrangement of a typical gasket for use with such plates in connection with FIG. 4 to 6.

The present invention takes account of the observation that, for a fuel cell unit to be sealed to allow it to function, a fluid seal is only required on one surface of the MEA, as opposed to both surfaces of the MEA as shown in FIGS. 5 and 6, and this can be achieved with a unitary gasket. An MEA 44 sealed on only one surface 76 is illustrated schematically in FIG. 7, where the MEA 44 is sealed against a gasket 72 along a sealing surface 74*b*. Provided this surface is adequately sealed, the opposite surface 75 of the MEA does not need to be sealed against the gasket 72, since the sealing surface 74*c* prevents undesired passage of fluid from within or without the MEA, and the sealing surface 74*b* prevents the passage of fluid from one side of the MEA to the other (the membrane of the MEA 44 permitting substantially only protonic conduction).

Figure 7:
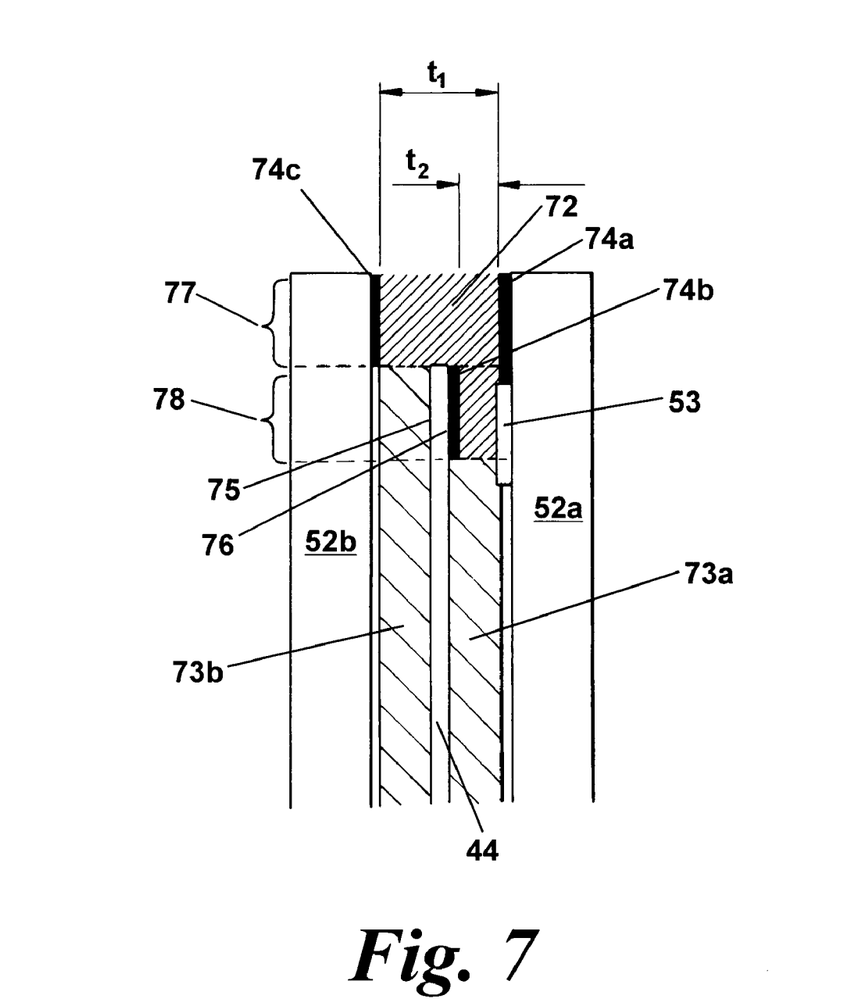
FIG. 7 shows a schematic cross-sectional view of a further gasket arrangement for sealing a membrane-electrode assembly.

Thus. the gasket 72, by being in contact with both fluid flow field plates 52*a*, 52*b*, effectively seals the cathode and anode compartments of the fuel cell (largely defined by the diffuser layers 73*a*, 73*b*). The fluids in the cathode and anode compartments are prevented from mixing by a fluid seal formed by the sealing surface 74*b* on a first surface 76 of the MEA 44, with the mating surfaces of this fluid seal being provided between a perimeter of the MEA 44 and the gasket 72.

Thus, it can be seen that the gasket 72 is provided with a first sealing surface 74*a* on a first face of the gasket and a second sealing surface 74*c* on an opposing face of the gasket 72. The gasket also has a third sealing surface 74*b* and defines a step profile between the second sealing surface and the third sealing surface. The first and second sealing surfaces provide fluid seals against first and second fluid flow field plates, respectively. The third sealing surface 74*b* provides a fluid seal against only a first face 76 of the MEA 44. The third sealing surface 74*b* is substantially plane parallel to the first 74*a* and second 74*c* sealing surfaces. A second surface 75 of the MEA does not form a fluid seal against the gasket 72. In the example shown in FIG. 7, a first portion 77 of the gasket 72 extending between the second sealing surface 74*c* and the first sealing surface 74*a* is of a thickness $t_1$ which is greater than a thickness $t_2$ of a second portion 78 of the gasket 72 extending between the third sealing surface 74*b* and the first sealing surface 74*a*. This difference in thickness $(t_1 - t_2)$ is preferably designed to accommodate the thickness of the MEA 44 and the diffuser layer 73b so that the fluid seal 74b may be provided without significant distortion of the gasket material.

The gasket 72 may be formed by, for example, moulding or any other suitable process that can result in the required step profile cross-section with a reduced thickness at the third sealing surface 74b.

Figure 8:
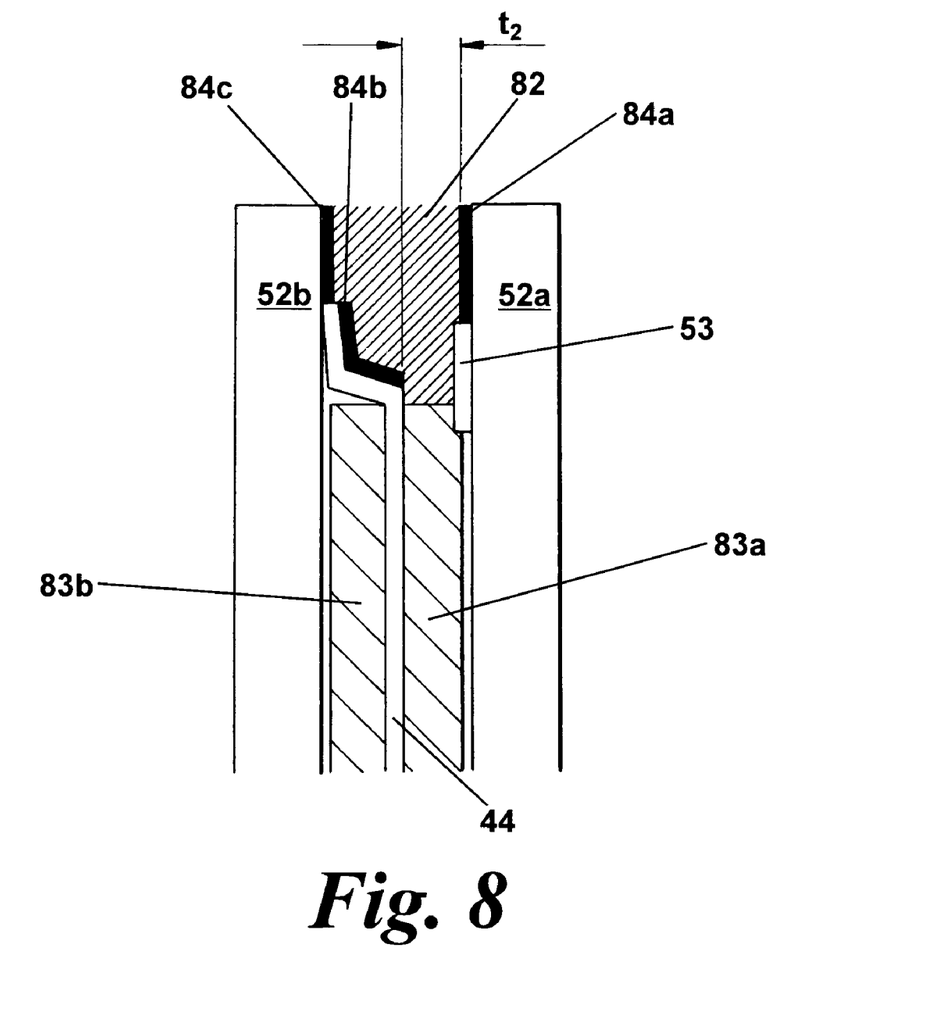
FIG. 8 shows a schematic cross-sectional view of a further gasket arrangement for sealing a membrane-electrode assembly.

An alternative sealing arrangement following a similar general principle is shown schematically in FIG. 8. In this, a gasket 82 is preferably initially of uniform thickness, i.e. when under no applied pressure, but is of a type that is of variable or increased compressibility. Examples of gaskets with increased variable compressibility are disclosed in UK patent application no. 0601986.3. Cavities may be provided on at least a portion of one or both surfaces of the gasket 82 to increase the local compressibility of the gasket material in that portion. For example, cavities may be provided in at least the portion of the gasket 82 defined by a third sealing surface 84b. The local increase in compressibility permits the gasket 82 to compress further under the same applied pressure. The gasket 82 malt thereby compress to a required thickness $t_2$ to accommodate the MEA 44 in the region defined by a third sealing surface 84b without a reduced ability to provide fluid seals at a first sealing surface 84a and a second sealing surface 84c. This arrangement preferably provides for the third sealing surface 84b to be at least partially obliquely angled relative to the first 84a and second 84c sealing surfaces to avoid undue distortion of the MEA 44.

The use of a region of reduced thickness, as in FIG. 7, or a region of increased compressibility, e.g. through a plurality of cavities as in FIG. 8, or a combination of both, facilitates an adequate fluid seal around the MEA 44 using a single gasket without requiring a 're-entrant' or c-shaped profile as in the gasket 61 of FIG. 6.

In both of the embodiments of FIGS. 7 and 8 it can be seen that the third sealing surface 74b, 84b is inwardly adjacent to the second sealing surface 74c, 84c, which expression is intended to indicate that the third sealing surface is towards the centre of the fuel cell compared to the second sealing surface.

An advantage of the present invention as described above is that the number of components required for sealing a fuel cell is reduced, through a reduction in the number of sealing surfaces. Further advantages include a reduction in complexity of assembly of such a fuel cell, and a potentially more cost-effective MEA design through a reduction in the total MEA area. The invention also enables a fuel cell to be built up in sequential layers, as detailed below.

Figure 9:
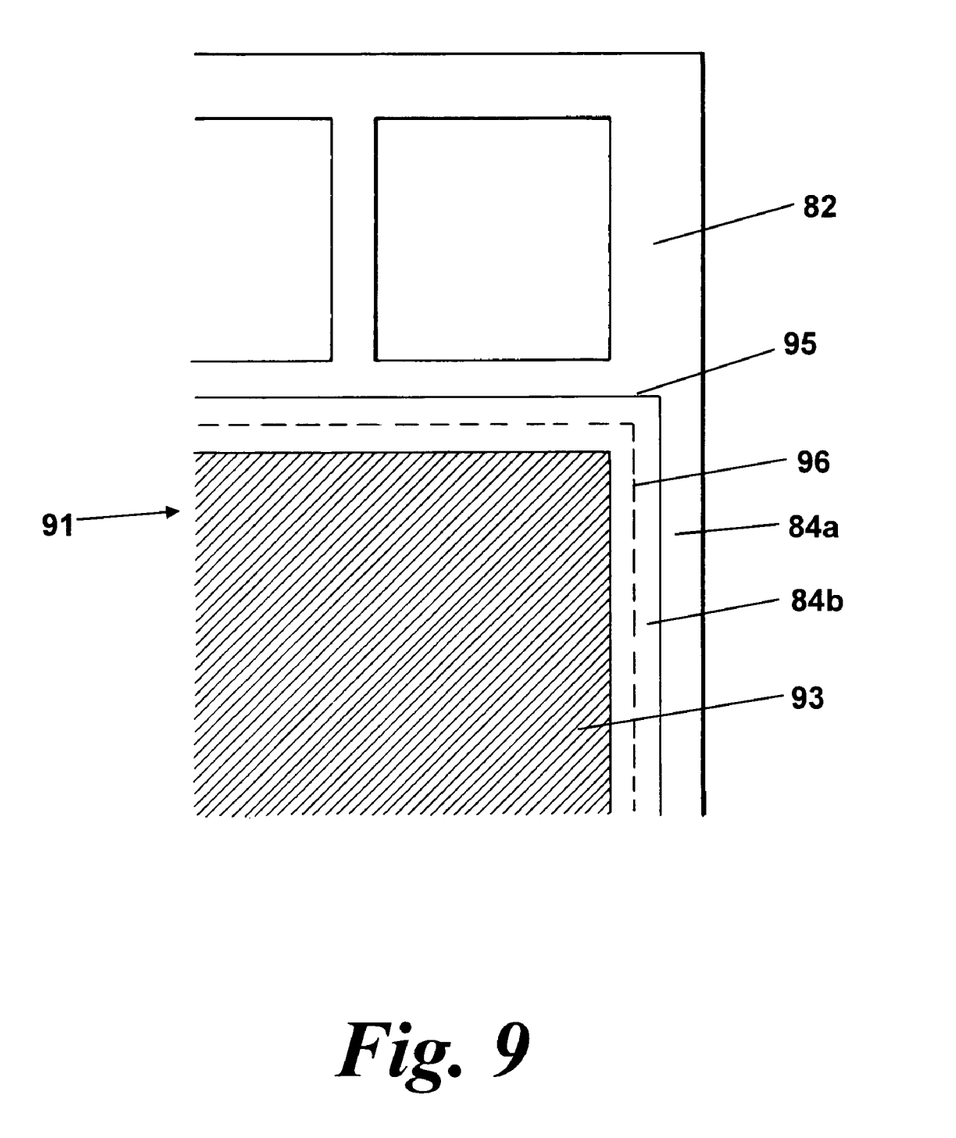
FIG. 9 shows a schematic plan view of a membrane-electrode assembly in position over an embodiment of a gasket according to the invention.

FIG. 9 illustrates schematically an arrangement showing how an MEA 91, with a diffuser layer 93 on both sides thereof, may be positioned in place over a gasket 82. The MEA in this example is reduced in size compared to that shown in FIG. 4. An outer perimeter 95 of the MBA 91 overlies the gasket 82, such that an inner perimeter 96 of the gasket 82 lies entirely within the MEA outer perimeter 95. When in place between the torso fluid flow field plates 52a, 52b, the third sealing surface 84b is provided on an inside peripheral surface of the gasket 82, extending between the MEA outer perimeter 95 and the gasket inner perimeter 96, thereby providing a fluid seal between the inside peripheral surface of the gasket 82 and an outside peripheral surface of the MEA 91. This arrangement can effectively seal the MEA outer perimeter 95 from the external atmosphere, which will limit dehydration of the membrane of the MEA in use.

In a general aspect, the gasket 82 has no re-entrant inner face to seal against the MEA 44. Referring, to FIGS. 7 and 8, a fuel cell stack comprising the gasket 72, 82 may be built up by layering in sequence the fluid flow field plate 52a, the gasket 72, 82, the diffuser layer 73a, 83a, the MEA 44, the diffuser layer 73b, 83b and the fluid flow field plate 52b. The gasket does not need to be pre-formed onto the MEA and thus does not need to be customised to an exact cell configuration.

Figure 10:
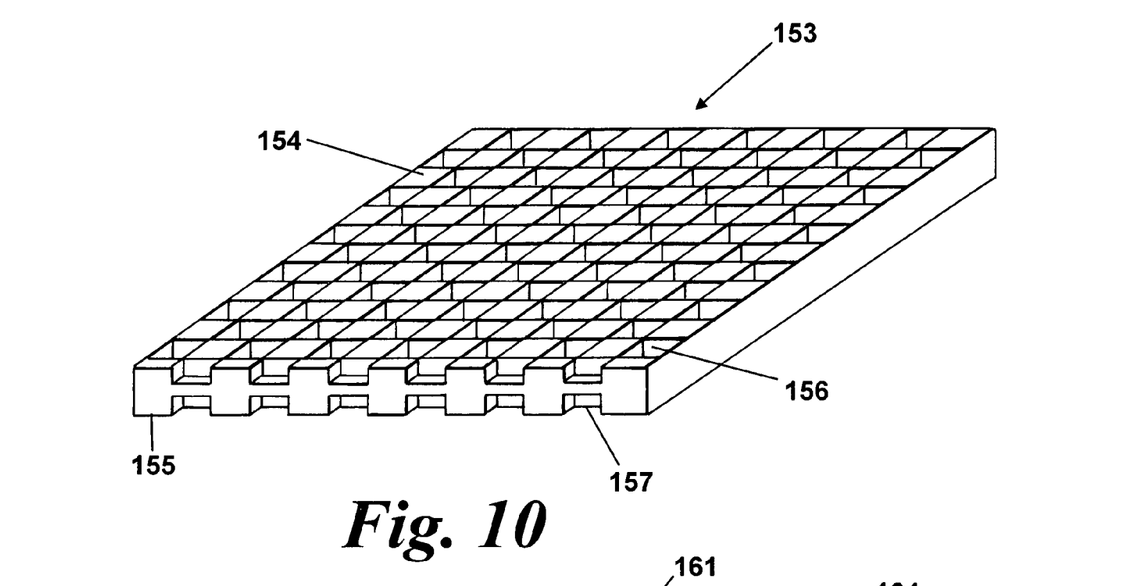
FIG. 10 shows a perspective view of the construction of part of a gasket comprising a plurality of cavities.
Figure 11:
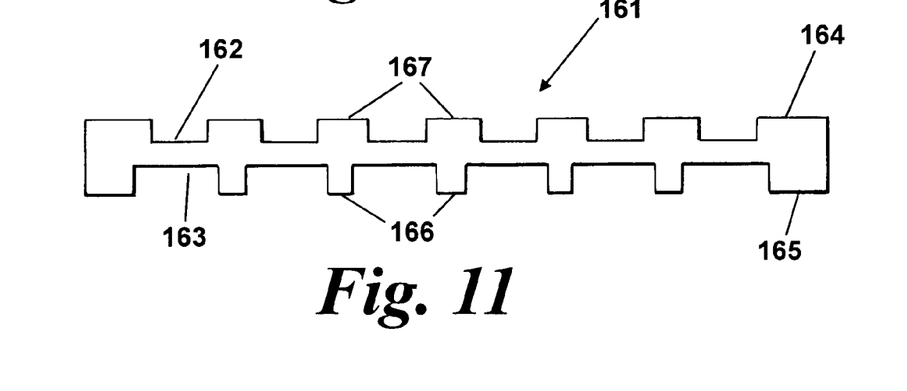
FIG. 11 shows a cross-sectional view of a portion of the gasket of FIG. 10.
Figure 12:
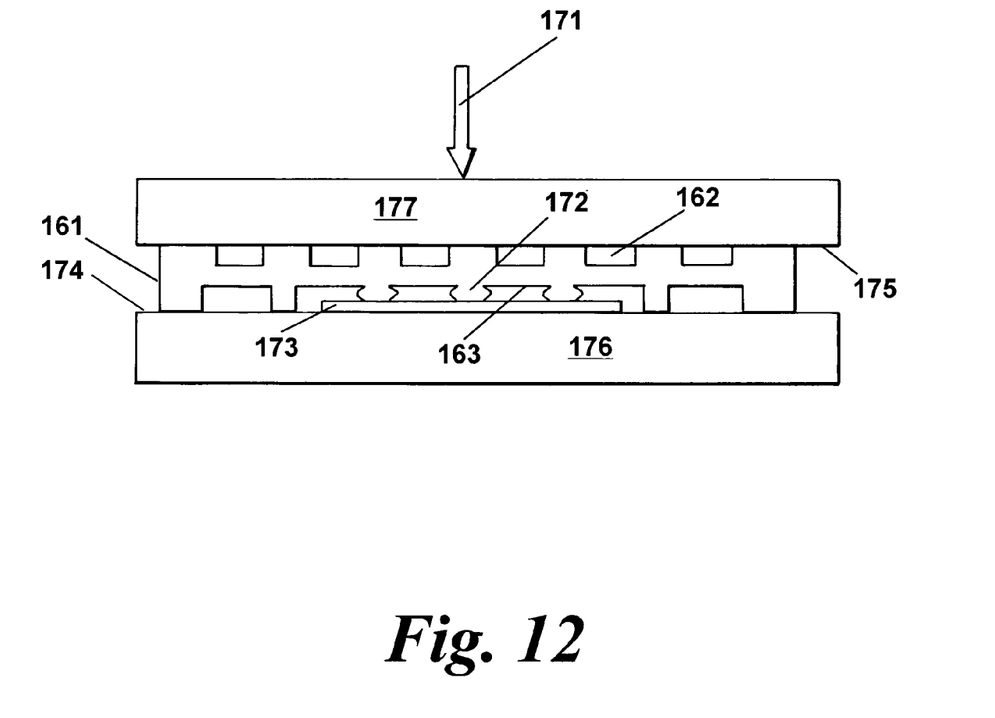
FIG. 12 shows a cross-sectional schematic view of a portion of a gasket of FIG. 10 while under an applied pressure.

A preferred embodiment where the gasket 82 is provided with a plurality of cavities proximate at least a portion of one or both surfaces is further illustrated in FIGS. 10 to 12.

FIG. 10 illustrates a representative portion of a gasket 153 suitable for the present invention. The gasket 153 has a first sealing surface 154 and a second sealing surface 155. A first plurality of cavities 156 is provided within the gasket 153 at the first sealing surface and extending over the portion of the gasket. The cavities 156 extend in a regular array over the portion of the gasket 153 shown. Also shown is a second plurality of cavities 157 provided within the gasket at the second sealing surface 155, being in this example substantially similar in size and arrangement to the first plurality of cavities.

Although the cavities 156 are shown in FIG. 10 as being provided at the surface 154, in other embodiments the cavities 156 may be provided below the surface 154, but sufficiently close to the surface so as to influence the local surface compressibility through the thickness of the gasket 153.

The sealing surfaces 154, 155 of the gasket are defined as being those surfaces which comes into contact with the surface of a component to which the gasket is to be sealed. The sealing surface does not generally therefore include the interior surface of the cavities 156, 157. However, as the pressure applied to the gasket 153 is increased, a proportion of the interior surface of the cavities 156, 157 may become part of the sealing surface of the gasket 153, which proportion increases with increasing applied pressure.

The term "cavity density" is used herein as a measure of the number of cavities present over any defined area of the gasket 153. The cavity density over a first sealing surface 154 of a portion of the gasket 153 may be different from the cavity density over a second sealing surface 155 of the same portion of the gasket 153. For example, if the area of the sealing surface 154 of the gasket 153 of FIG. 10 is 1 cm2 and the number of cavities is 36, the cavity density on the first sealing surface is 36 cm$^{-2}$.

The term "cavity volume" as used herein is the total void volume of any given cavity, which may be usefully given in terms of an average figure for cavities in the gasket 153 or a certain region thereof.

It will be recognised that the cavity density and the cavity volume in a region of the gasket will each, at least in part, determine the compressibility of that region of the gasket.

The gasket of the present invention preferably comprises a compressible material that, in use, has sufficient compressibility to seal against the various internal surfaces of a fuel cell assembly in which the gasket is to be used.

The term "compressible material" is intended to encompass solid materials which can be significantly deformed under applied compressive pressure, and whose physical mechanical properties may be characterised by a combination of elastic, i.e. recoverable, and plastic, i.e. permanent and non-recoverable, deformation under an applied pressure. Time-dependent effects such as creep and viscoelasticity may also define in part the properties of the compressible material.

An increase in the compressibility of a region of the gasket will correspond to a reduction in the pressure needed to compress the total thickness of that region by the same degree.

Alternatively put, the same applied pressure will cause the total thickness of that region to be reduced by a greater degree.

Shown in FIG. 11 is a cross-sectional view of an alternative asymmetric arrangement of cavities 162, 163 in a gasket 161 suitable for the present invention, in which the cavity volumes are different on the first sealing surface 164 and second sealing surface 165. Cavities 162 proximate the first sealing surface 164 are of different dimensions to cavities 163 proximate the second sealing surface 165. The result of this type of variation in cavity volume will be that the gasket material 166 between the larger cavities 163 is able to compress further than the gasket material 167 between the smaller cavities 162 under the same applied pressure.

A similar effect to that shown in FIG. 11 may be obtained by, instead of altering the average cavity volume beneath each of the first 164 and second 165 sealing surfaces, altering the spacing between the cavities and thus affecting the cavity density.

The cavity density and/or cavity volumes may be different on at least selected opposing surface portions of the gasket proximate the first 164 and second 165 sealing surfaces, the opposing surface portions being selected regions of the first 164 and second 165 sealing surfaces that are substantially coextensive on opposite sealing surfaces of the gasket 161.

In such an asymmetric arrangement in the gasket 161 of FIG. 11, the surface adhesion properties can consequently be biased towards one surface. The contact area of one sealing surface 164 of the gasket 161 compared to the other sealing surface 165 will tend to prefer adherence to one surface over the other without the need for adhesives or surface preparations.

Shorten in FIG. 12 is a schematic view in cross-section of the behaviour of such a gasket 161 under compression between an upper component 177 and a lower component 176. The gasket 161 is situated between two component surfaces 174, 175. On the lower component surface 174 is situated a surface feature 173, which protrudes out of the plane of the component surface 174. Applying pressure in the direction indicated by arrow 171 causes the casket material in the compensating region 172 to compress further than the material outside the compensating region. Additional compression of the gasket is taken up within the volume of the gasket itself, and does not cause any additional bulging around the external perimeter of the gasket 161. The cavities 163 permit the surrounding casket material within the compensating region 172 to bulge into the cavities 163 along directions orthogonal to the direction of application of force. The surface feature 173 could, for example, be a foil or shim of relatively incompressible material, such as a water distribution foil, positioned to cover selected regions of the fluid flow plate. Preferably, for the purpose of the present invention, the surface feature is that of the perimeter edge 95 of the MEA 91, as described in relation to FIG. 9. Since the gasket 161 is able to compressible deform around the surface feature 173, the seal around the surface feature 173 is not compromised by its presence.

The gasket 153, 161 may preferably comprise rectangular cavities 156, 157, 162, 163 arranged in a regular array, for example in a substantially uniformly spaced square pattern, as is shown in FIG. 10. Other types of regular repeating patterns such as hexagonal or triangular patterns are also envisaged. Non-repeating patterns or random distributions of cavities, which also may be characterised by a cavity density and an average cavity volume, are also envisaged to be within the scope of the invention.

It is to be understood that the term "cavities" is intended to encompass definitions that apply to arrays of individually isolated cavities across a gasket, as well as arrays of interconnected cavities formed within arrays of individually isolated pillars or other raised features. A gasket of the present invention may comprise either one or both types of cavities across at least a portion of one or more sealing surfaces.

It is envisaged that a variety of conventional gasket materials may be used in the present invention, such as silicone, nitrile or butyl rubbers. However, other materials, such as expanded PTFE, may also be used.

The thickness of the gasket is preferably less than 10 mm. More preferably, the uncompressed gasket thickness lies between 0.1 and 3 mm, and more preferably still between 0.1 and 1 mm.

Preferably, the average volume of the cavities 156, 157, 162, 163 is less than 5 $mm^3$, and more preferably lies within the range of 0.001 to 1 $mm^3$. The cavities are preferably substantially cuboid in shape, although the cavities may be any suitable shape, and also preferably have an average linear dimension within the range of 0.1 to 1 mm.

The cavities of a gasket 53, 61 of the present invention are preferably formed by applying a texture to the surface(s) of a gasket of uniform thickness. This texturing may be performed by compression moulding of the gasket, for example between shaped platens under conditions of heat and pressure in order to plastically deform the gasket material into the required shape. Alternatively, various techniques known in the art may be used to form the gasket material of the present invention, such as casting, injection moulding or rolling/calendering using textured rollers.

Cavities as described above may be provided in at least a portion of a gasket of the present invention. For example, cavities may be provided over the region of a gasket defining the third sealing surface 84b, so that the additional thickness of the MEA 44 may be accommodated in that region. Alternatively, cavities may be provided over a greater portion of a surface of the gasket, or over portions or the whole of both surfaces.

Other embodiments are envisaged to be within the scope of the appended claims.

The invention claimed is:

1. A fuel cell assembly comprising: a first fluid flow field plate; a second fluid flow field plate;
    a membrane electrode assembly having first and second opposing faces, interposed between the first and second fluid flow field plates;
    a gasket, consisting of a single material, extending between the first and second fluid flow field plates and having first and second opposing faces forming respective first and second sealing surfaces therewith,
    the second face of the gasket also defining a third sealing surface, by which the gasket is in contact with only one face of the membrane electrode assembly;
    wherein the second face of the gasket has a region of increased compressibility associated with the third sealing surface compared to a region associated with the second sealing surface to permit the region associated with the third sealing surface to compress further than the region associated with the second sealing surface under the same applied pressure, wherein the region of increased compressibility associated with the third sealing surface has a higher cavity volume or cavity density than the region associated with the second sealing surface.

2. The fuel cell assembly of claim 1 in which the third sealing surface is inwardly adjacent to the second sealing surface.

3. The fuel cell assembly of claim 1 in which the third sealing surface is substantially plane parallel to the second sealing surface.

4. The fuel cell assembly of claim 1 wherein the third sealing surface is obliquely angled relative to the second sealing surface.

5. The fuel cell assembly of claim 1 in which the gasket defines a step profile between the second and third sealing surfaces.

6. The fuel cell assembly of claim 1 wherein the region associated with the second sealing surface and the region associated with the third sealing surface extend between the first and second faces of the gasket.

* * * * *